United States Patent
Fleischmann et al.

(10) Patent No.: US 9,435,105 B2
(45) Date of Patent: Sep. 6, 2016

(54) METHOD AND SYSTEM FOR CONTROLLING PUMP OUTLET PRESSURE BETWEEN DIFFERENT OPERATING MODES

(71) Applicant: Deere & Company, Moline, IL (US)

(72) Inventors: Steve G. Fleischmann, Dubuque, IA (US); Jason L. Mueller, Platteville, WI (US)

(73) Assignee: DEERE & COMPANY, Moline, IL (US)

( * ) Notice: Subject to any disclaimer, the term of this patent is extended or adjusted under 35 U.S.C. 154(b) by 211 days.

(21) Appl. No.: 14/271,555

(22) Filed: May 7, 2014

(65) Prior Publication Data

US 2015/0322649 A1  Nov. 12, 2015

(51) Int. Cl.
*E02F 9/22* (2006.01)
*E02F 9/20* (2006.01)
*A01G 9/12* (2006.01)
*A01G 23/00* (2006.01)
*E02F 3/96* (2006.01)
*E02F 9/16* (2006.01)

(52) U.S. Cl.
CPC ............. *E02F 9/2235* (2013.01); *A01G 9/122* (2013.01); *A01G 23/00* (2013.01); *E02F 3/964* (2013.01); *E02F 9/166* (2013.01); *E02F 9/2062* (2013.01); *E02F 9/2228* (2013.01); *E02F 9/2246* (2013.01)

(58) Field of Classification Search
CPC .... E02F 9/2235; E02F 9/2062; E02F 9/2228
See application file for complete search history.

(56) References Cited

U.S. PATENT DOCUMENTS

| | | | | | |
|---|---|---|---|---|---|
| 5,826,666 | A | * | 10/1998 | Tozawa | E02F 3/437 172/2 |
| 6,234,254 | B1 | * | 5/2001 | Dietz | A01B 67/00 172/3 |
| 2003/0200747 | A1 | * | 10/2003 | Matsumoto | E02F 9/2235 60/452 |
| 2012/0096843 | A1 | * | 4/2012 | Hennemann | E02F 9/2066 60/327 |
| 2012/0283919 | A1 | * | 11/2012 | Kuras | B60L 11/005 701/50 |
| 2013/0280097 | A1 | * | 10/2013 | Narotham | F04B 49/00 417/1 |
| 2014/0178164 | A1 | * | 6/2014 | Peterson | E02F 3/432 414/685 |

* cited by examiner

Primary Examiner — Mussa A Shaawat
(74) Attorney, Agent, or Firm — Taft Stettinius & Hollister LLP; Stephen F. Rost

(57) ABSTRACT

The present disclosure provides a method of controlling a work implement of a machine. The machine includes a controller for controlling the implement, a sensor, a hydraulic pump for producing a fluid pressure, and a valve disposed in communication with the pump. The method includes selectively operating the machine according to a first operating mode, wherein in the first operating mode the hydraulic pump is operably controlled to produce a fluid pressure between a first pressure and a second pressure, the second pressure being greater than the first pressure. The method also includes sending a signal to the controller, the signal corresponding to a request for a fluid pressure greater than the second pressure. The method further includes transitioning from the first operating mode to a second operating mode and increasing the fluid pressure from the second pressure to a third pressure during the transition.

20 Claims, 5 Drawing Sheets

METHOD AND SYSTEM FOR CONTROLLING PUMP OUTLET PRESSURE BETWEEN DIFFERENT OPERATING MODES

FIELD OF THE DISCLOSURE

The present disclosure relates to controlling a pump outlet pressure of a machine, and in particular to a method and system for controlling a machine in different operating modes to achieve different pump outlet pressures.

BACKGROUND

Many conventional work machines, such as those in the construction and forestry industries, perform various tasks such as craning or digging functions. To perform some of these functions, machines may require additional operating pressures to lift heavier objects or dig rougher terrain. Thus, a means for effectively increasing a machine's craning and digging capability without negatively impacting other performance characteristics are considered in the present disclosure.

SUMMARY

In a first embodiment of the present disclosure, a method is provided for controlling a work implement of a machine. The machine includes a controller for controlling the implement, a sensor, a hydraulic pump for producing a fluid pressure, and a valve disposed in communication with the pump. The method includes selectively operating the machine according to a first operating mode, wherein in the first operating mode the hydraulic pump is operably controlled to produce a fluid pressure between a first pressure and a second pressure, the second pressure being greater than the first pressure; sending a signal to the controller, the signal corresponding to a request for a fluid pressure greater than the second pressure; transitioning over a period of time from the first operating mode to a second operating mode; and increasing the fluid pressure from the second pressure to a third pressure over the period of time.

In one example of this embodiment, the method includes detecting a fluid pressure equivalent to a threshold pressure with the sensor, the threshold pressure being equal to or less than the second pressure; and sending an electronic signal to the valve to increase the fluid pressure. In a second example, the method includes continuously controlling the pump to produce the third pressure during the second operating mode. In a third example, the method includes detecting a request to produce a fluid pressure between the first pressure and the second pressure while operating in the second operating mode; transitioning over a second period of time from the second operating mode to the first operating mode; and decreasing the fluid pressure from the third pressure to the requested pressure between the first pressure and the second pressure. In a fourth example, the second period of time is shorter than the first period of time.

In another embodiment, a method is provided for controlling a work implement of a machine. The machine includes a controller, a sensor, a pump, and a valve disposed in fluid communication with the pump. The method includes selectively controlling the vehicle according to a first operating mode, wherein in the first operating mode the hydraulic pump is operably controlled to produce a fluid pressure between a first pressure and a second pressure, the second pressure being greater than the first pressure; detecting a stall condition of the machine with the sensor; communicating the stall condition to the controller; determining if a second operating mode of the machine is enabled, wherein in the second operating mode the hydraulic pump is operably controlled to produce the fluid pressure at a third pressure, the third pressure being greater than the second pressure; transitioning from the first operating mode to the second operating mode if the second operating mode is enabled; and controlling the pump outlet pressure to the third pressure.

In one example of this embodiment, the detecting step includes detecting an input command from an operator control mechanism; measuring a function velocity associated with the implement; and comparing the measured function velocity to a predefined function velocity corresponding to the detected input command. In a second example, the detecting an input command includes measuring a linear displacement, an angular displacement, or a force applied to the operator control mechanism. In a third example, the detecting an input command includes detecting a position or force applied to the valve. In a fourth example, the detecting an input command includes measuring a control pressure or spool position of the valve. In a fifth example, the detecting step includes measuring a displacement of the pump or a flow rate at a location within a hydraulic control system of the machine; and comparing the measured displacement to a first threshold or the measured flow rate to a second threshold, the first threshold corresponding to a relationship between pump displacement and a function velocity of the implement and the second threshold corresponding to a relationship between a predefined flow rate in the system and a function velocity of the implement.

In a sixth example of this embodiment, the detecting step includes measuring a pressure in a hydraulic control system of the machine; comparing the measured pressure to a threshold pressure; and detecting the stall condition if the measured pressure is equal to or greater than the threshold pressure. In a seventh example, the method includes controllably adjusting the pump outlet pressure to the third pressure with an electro-hydraulic valve or an electronically-controlled pump. In an eighth example, the method includes controlling the electro-hydraulic valve or electronically-controlled pump to incrementally increase pressure from the second pressure to the third pressure when the second operating mode is enabled. In a ninth example, the method includes detecting an input command to return to selectively operating the machine in the first operating mode; controlling the electro-hydraulic valve or electronically-controlled pump to incrementally decrease pressure from the third pressure to a fourth pressure, the fourth pressure being less than or equal to the second pressure; and transitioning from the second operating mode to the first operating mode.

In a different embodiment of this disclosure, a method is provided for operating a machine having a hydraulic control system for controlling a work implement. The hydraulic control system includes a valve and a pump. The method includes controlling the machine according to a first operating mode, the first operating mode being operable to produce a pump outlet pressure between a first pressure and a second pressure, the second pressure being greater than the first pressure; monitoring a load sense signal indicative of a load pressure in the hydraulic control system; detecting when the load sense signal reaches a threshold pressure associated with a stall condition; controlling the machine according to a second operating mode when the stall condition is detected; and increasing a pump outlet pressure to a third pressure as long as the load sense signal is detected at or above the threshold, the third pressure being greater than the second pressure.

In one example, the method includes adjusting an engine speed of the machine to a predefined speed as the machine operates in the second operating mode; and maintaining the engine speed at the defined speed so long as the load sense signal is detected at or above the threshold. In a second example, the method includes transitioning from the first operating mode to the second operating mode when the machine is being operated in the first operating mode and the load sense signal is detected at or above the threshold, wherein the pump outlet pressure is increased over a first period of time at a first rate; and transitioning from the second operating mode to the first operating mode when the machine is being operated in the second operating mode and the load sense signal is detected at or below the threshold, wherein the pump outlet pressure is decreased over a second period of time at a second rate. In a third example, the method includes controlling the valve or pump to incrementally increase or decrease the pump outlet pressure as the machine transitions between the first and second operating modes. In a fourth example, the first rate is the same as or less than the second rate.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
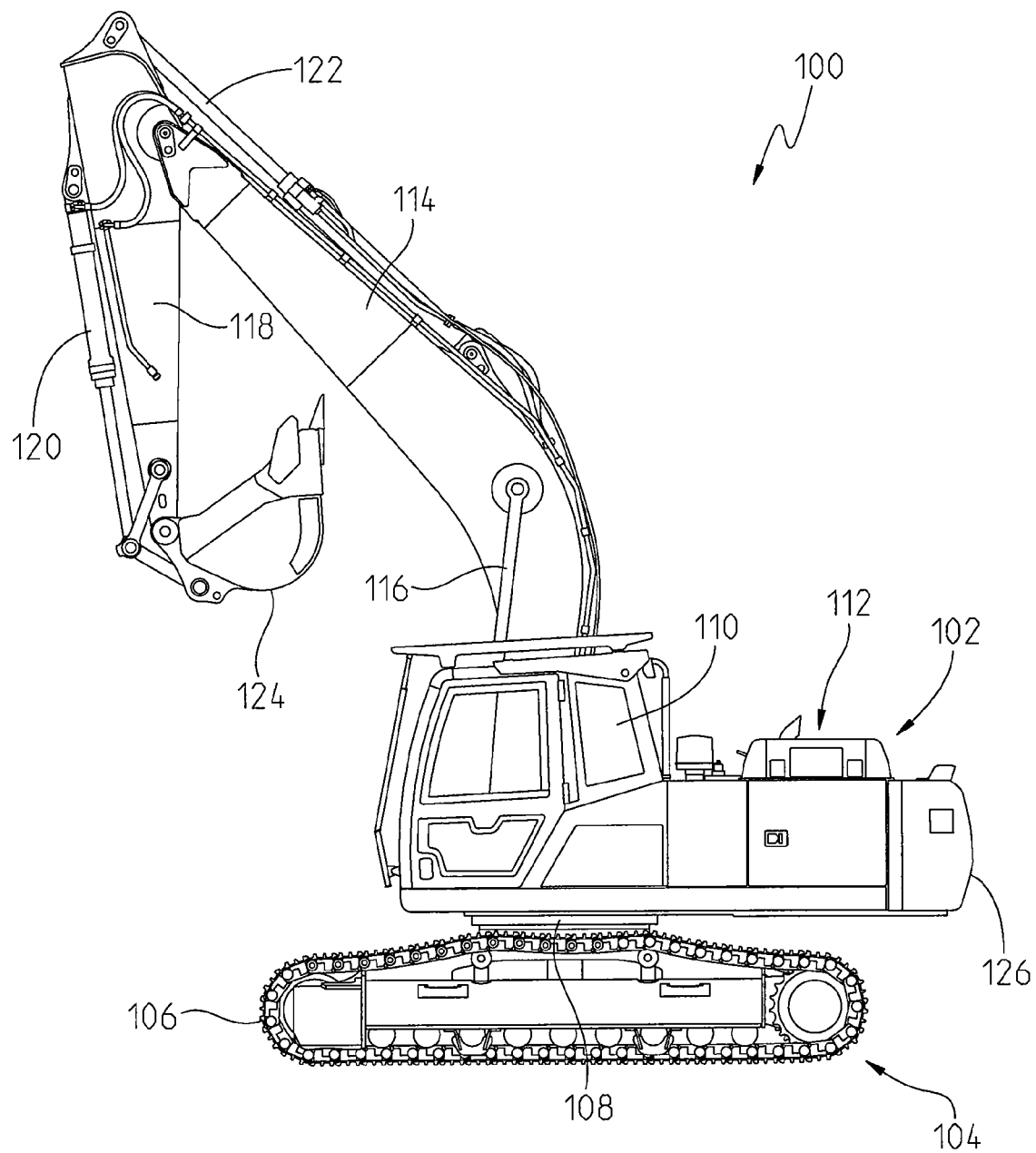
FIG. 1 is a side view of a machine.

An example embodiment of a work machine is shown in FIG. 1. The machine is embodied as an excavator 100. The present disclosure is not limited, however, to an excavator and may extend to other work machines such as a loader, crawler, harvester, skidder, backhoe, feller buncher, motor grader, or any other work machine. As such, while the figures and forthcoming description may relate to an excavator, it is to be understood that the scope of the present disclosure extends beyond an excavator and, where applicable, the term "machine" or "work machine" will be used instead. The term "machine" or "work machine" is intended to be broader and encompass other vehicles besides an excavator for purposes of this disclosure.

Referring to FIG. 1, the machine 100 includes a chassis comprising an upper frame 102 pivotally mounted to an undercarriage 104. The upper frame 102 can be pivotally mounted on the undercarriage 104 by means of a swing pivot 108. The upper frame 102 is rotatable about 360° relative to the undercarriage 104 on the swing pivot 108. A hydraulic motor (not shown) can drive a gear train (not shown) for pivoting the upper frame 102 about the swing pivot 108.

The undercarriage 104 can include a pair of ground-engaging mechanisms such as tracks 106 on opposite sides of the undercarriage 104 for moving along the ground. Alternatively, the machine 100 can include more than two tracks or wheels for engaging the ground. The upper frame 102 includes a cab 110 in which the machine operator controls the machine. The cab 110 can include a control system (not shown) including, but not limited to, a steering wheel, a control level, a joystick, control pedals, or control buttons. The operator can actuate one or more controls of the control system for purposes of operating the machine 100.

The machine 100 also includes a boom 114 that extends from the upper frame 102 adjacent to the cab 110. The boom 114 is rotatable about a vertical arc by actuation of a pair of boom cylinders 116. A dipper stick or arm 118 is rotatably mounted at one end of the boom 114 and its position is controlled by a hydraulic cylinder 122. The opposite end of the boom 114 is rotatably coupled to the upper frame 102. At the end opposite the boom 114, the dipper stick or arm 118 is rotatably coupled to a work implement or bucket 124 that is pivotable relative to the arm 118 by means of a hydraulic cylinder 120.

The upper frame 102 of the machine 100 includes an outer shell cover over an engine assembly 112. At an end opposite the cab 110, the upper frame 102 includes a counterweight body 126. The counterweight body 126 comprises a housing filled with material to add weight to the machine and offset a load collected in the bucket 124. The offset weight can improve the craning or digging performance characteristics of the machine 100.

Figure 2:
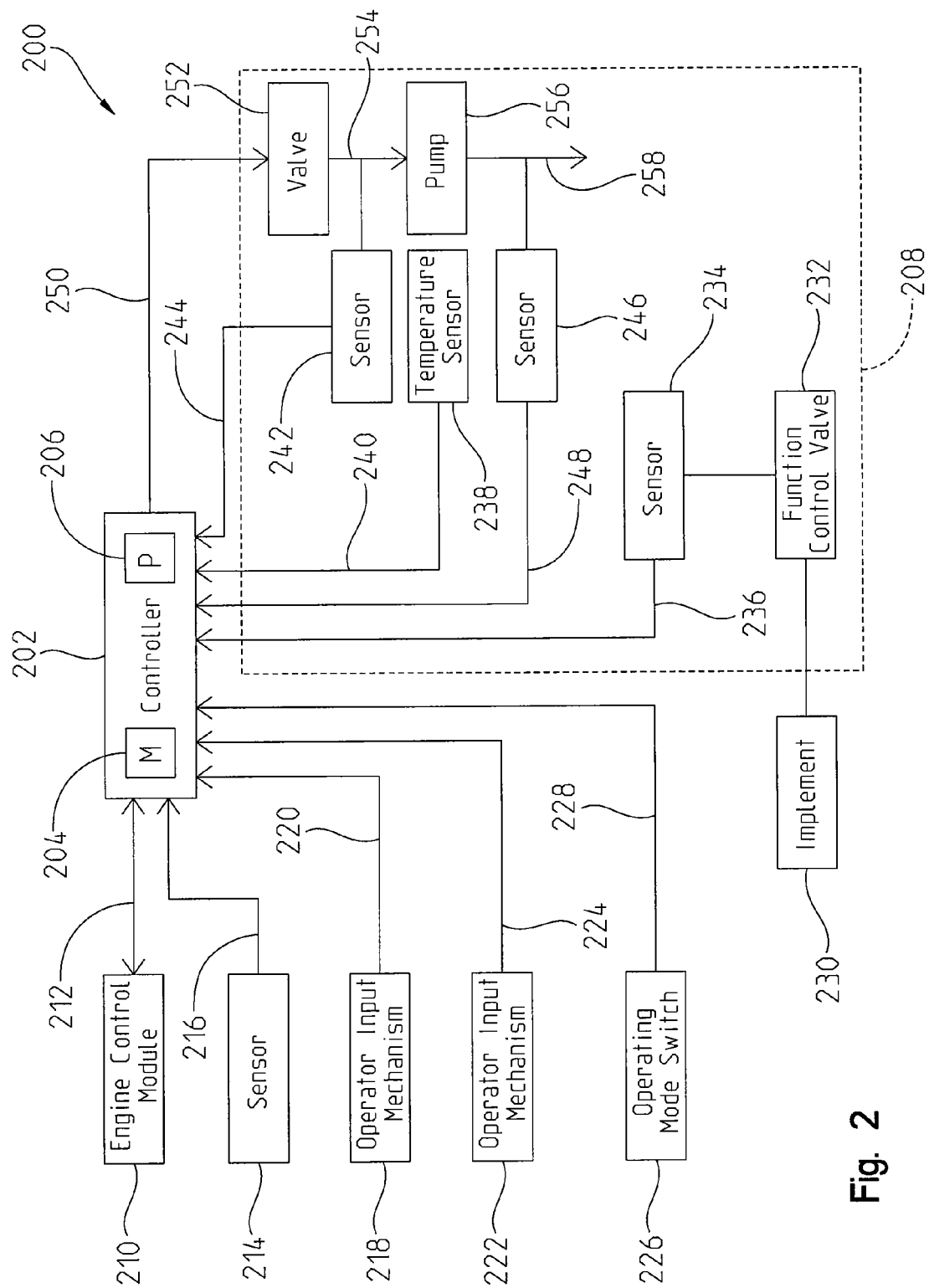
FIG. 2 is a schematic for operating the machine of FIG. 1 and controlling an implement thereof.

In the present disclosure, the machine 100 can include a control system for controlling the operation of the machine. Referring to FIG. 2, for example, the machine 100 can include a control system 200 with a controller 202. The controller 202 can include a memory 204 for storing software, logic, algorithms, programs, a set of instructions, etc. for controlling the machine 100. The controller 202 can also include a processor 206 for carrying out or executing the software, logic, algorithms, programs, set of instructions, etc. stored in the memory 204. The memory 204 can also store look-up tables, graphical representations of various functions, and other data or information for carrying out or executing the software, logic, algorithms, programs, set of instructions, etc. and controlling the machine 100.

The controller 202 can include a plurality of inputs and a plurality of outputs. For instance, the controller 202 can receive a signal from one or more inputs and send a corresponding signal to an output to execute a function or operation. As shown in FIG. 2, one or more of the inputs can be an electrical connection between the controller 202 and an engine control module 210. The electrical connection can be made via a CAN bus 212 or other communication link (e.g., wireless transceivers). Other conventional communication protocols may include J1587 data bus, J1939 data bus, IESCAN data bus, etc. Communication across the CAN bus 212 can include a commanded engine speed, actual engine speed, throttle position, engine torque, and other engine-specific variables.

The controller 202 can also be in electrical communication with different operator input mechanisms. For example, a first operator input mechanism 218 can include a joystick, throttle control mechanism, pedal, lever, switch, or other control mechanism. The first operator input mechanism 218 may be located within the cab 110 of the machine 100. An input command, e.g., a movement of a joystick, applied to the first operator input mechanism 218 can be communicated to the controller 202 via communication link 220. Similarly, the machine 100 can include a second operator input mechanism 222 located within the cab 110 of the machine 100 for sending another signal to the controller 202. A different communication link 224 can electrically couple the second operator input mechanism 222 with the controller 202. As an example, the first input control mechanism 218 may be a throttle control mechanism and the second input control mechanism 222 may be a joystick or lever for controlling an implement 230 of the machine 100. In FIG. 1, the implement is shown as a bucket 124, but this disclosure is not intended to be limited to a bucket. Other implements for performing craning, digging, and other operations are contemplated herein.

The embodiment depicted in FIG. 2 has the first input control mechanism 218 and the second input control mechanism 222 communicating with controller 202 over communication link 220 and communication link 224, respectively, but in alternative embodiments each of the first input control mechanism 218 and the second input control mechanism 222 may share a common communication link, such as CAN bus 212, with controller 202. Similarly, the other communication links depicted in FIG. 2 could be shared amongst multiple components in alternative embodiments.

A sensor 214 can also be disposed in electrical communication with the controller 202 by means of a communication link 216. In one example, the sensor 214 can be a seat position sensor that is positioned on a base of an operator's seat in the cab 110. The sensor 214 can communicate seat position (e.g., direction of which the seat is oriented depending on a type of machine) or whether the operator is occupying the seat to the controller 202. This input can impact how the controller 202 controls the machine 100 during a work operation. Moreover, the sensor 214 may be a switch or other detection mechanism that can electrically communicate an input signal to the controller 202.

The control system 200 can further include an operating mode switch 226. The operating mode switch 226 can be in electrical communication with the controller 202 via communication link 228. In one example, the operating mode switch 226 can be located in the cab 110 of the machine 100. The switch 226 can be triggered between an enabled position and a disabled position. In the enabled position, the switch 226 can communicate to the controller 202 that the operator desires to operate the machine 100 in a second operating mode, which will be described in further detail with respect to FIG. 3. If, however, the switch 226 is disabled, a corresponding signal can be communicated to the controller 202 indicative of the operator's desire to only operate according to a first operating mode.

The aforementioned inputs can be located at various locations on the machine, including in the cab 110 so that the operator can control the machine 100 as desired. As also shown in FIG. 2, however, the control system 200 can include a plurality of additional inputs that are configured or located within a hydraulic control system 208 of the machine 100. As shown, the hydraulic control system 208 can include a plurality of inputs and outputs of the control system 200. Depending on the type of machine and its control system, the inputs and outputs of the hydraulic control system 208 can differ. In any event, FIG. 2 is representative of one embodiment of a hydraulic control system 208 of a machine.

The hydraulic control system 208 can include a control valve 252 that is in electrical communication with the controller 202 via communication link 250. The control valve 252 can be one of a plurality of outputs in the system, and an electronic signal to a solenoid (not shown) of the control valve 252 can control the movement of the control valve 252 between a first position and a second position. Movement of the control valve 252 can adjust or control the performance or output of a hydraulic pump 256 in the hydraulic control system 208. Fluid can flow through the control valve 252 such that movement thereof can control or adjust the fluid pressure exiting the control valve 252. As such, fluid pressure 254 exits the control valve 252 and is fluidly coupled with the hydraulic pump 256 (e.g., via a pump control port). In turn, the hydraulic pump 256 can produce a pump outlet pressure 258 to control different functions of the machine 100.

Although the control valve 252 and hydraulic pump 256 are outputs of the controller 202, there are a plurality of inputs that are useful for controlling the outputs. For example, a temperature sensor 238 can be disposed in a fluid path of the hydraulic control system 208 to measure fluid temperature. Although only one temperature sensor is shown, there may be additional temperature sensors located throughout the hydraulic control system 208. Each temperature sensor can be in electrical communication with the controller 202. In FIG. 2, the temperature sensor 238 is in electrical communication with the controller 202 via communication link 240.

A plurality of pressure sensors can also be incorporated into the hydraulic control system 208. For example, one sensor 242 can measure or detect fluid pressure 254 exiting the control valve 252. The sensor 242 can communicate the fluid pressure to the controller 202 via communication link 244. Similarly, another sensor 246 can measure or detect outlet fluid pressure 258 from the hydraulic pump 256. Here, the sensor 246 can communicate pump outlet pressure 258 to the controller 202 via communication link 248. The fluid pressure 254 exiting the control valve 252 can be controlled to a desired pressure by the controller 202 controlling movement of the control valve 252, enabling closed loop control of the fluid pressure 254. Not all embodiments may comprise sensor 242 or an equivalent, and thus not all embodiments may enable closed loop control of the fluid pressure 254.

As previously described, the machine 100 can include an implement 230 such as a bucket, blade, etc. The implement 230 can be controlled by hydraulic cylinders similar to those shown in FIG. 1. Hydraulic fluid for controlling movement of the cylinders (not shown in FIG. 2) may be supplied by a function control valve 232 that is positioned within the hydraulic control system 208. The function control valve 232 can be located downstream from the hydraulic pump 256 such that a portion of the pump outlet pressure 258 flows through the function control valve 232 to control movement of the implement 230. In some aspects, the function control valve 232 may also be referred to as a "combination valve" if the machine is a loader backhoe, for example. As shown, a sensor 234 can detect or measure load sense pressure, described in further detail below, associated with the function control valve 232. The sensor 234 can communicate the load sense pressure to the controller 202 via communication link 236. Although in FIG. 2 only the implement 230 and its function control valve 232 are shown, other function control valves may be positioned within the hydraulic control system 208 for controlling hydraulic cylinders for the boom, dipper arm, etc. In this manner, the load sense pressure can be representative of the highest load sense pressure in the hydraulic control system 208.

As another example, an excavator can perform various functions. A load pressure can be generated in a workport of each hydraulic cylinder, and this pressure is communicated to the load sense pressure sensor through the function control valve 232. The function control valve 232 can communicate the highest load pressure in the system, and in a control system similar to that shown in FIG. 2, the load pressure can be communicated to the controller 202. Thus, if an operator controls a machine to lift an object, the load sense signal, which may be indicative of a function of the load, may increase to a threshold operating pressure. This signal, or load sense pressure, may be measured or detected by the sensor 234.

In many conventional machines, an operator can perform a craning or digging operation until a maximum operating pressure is reached. Under these circumstances, the machine has reached a stall condition, where movement of the implement ceases because additional pressure is unavailable to overcome the load placed on the implement 230, such as a craning or dig load. In this way, many conventional machines are limited by the system operating pressure. In this disclosure, however, various methods and control systems are proposed for increasing pump outlet pressure so that desired craning and digging functions can be performed without adding hardware to the machine.

Figure 3:
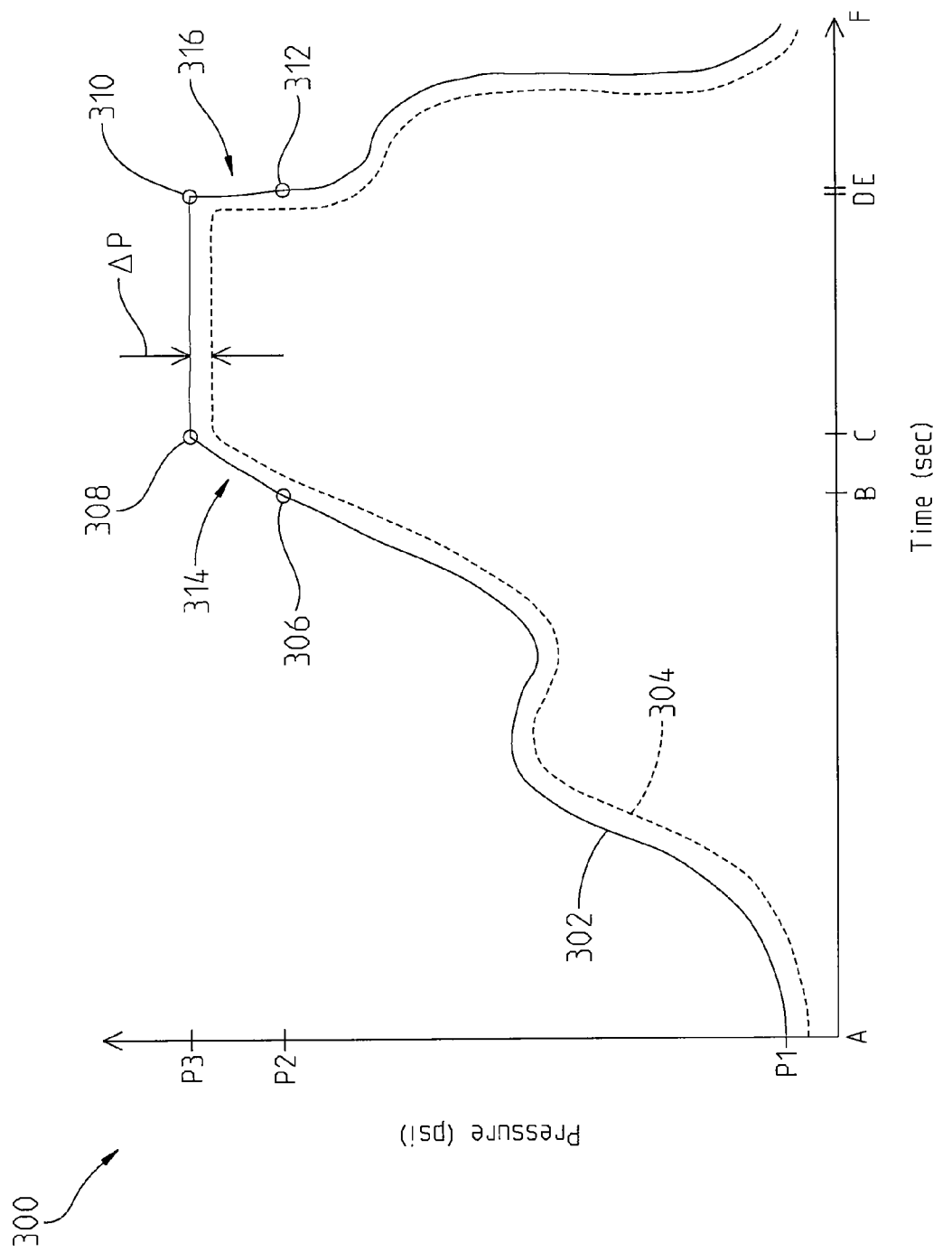
FIG. 3 is a graphical representation of controlling pump outlet pressure between different operating modes of the machine of FIG. 1.
Figure 4:
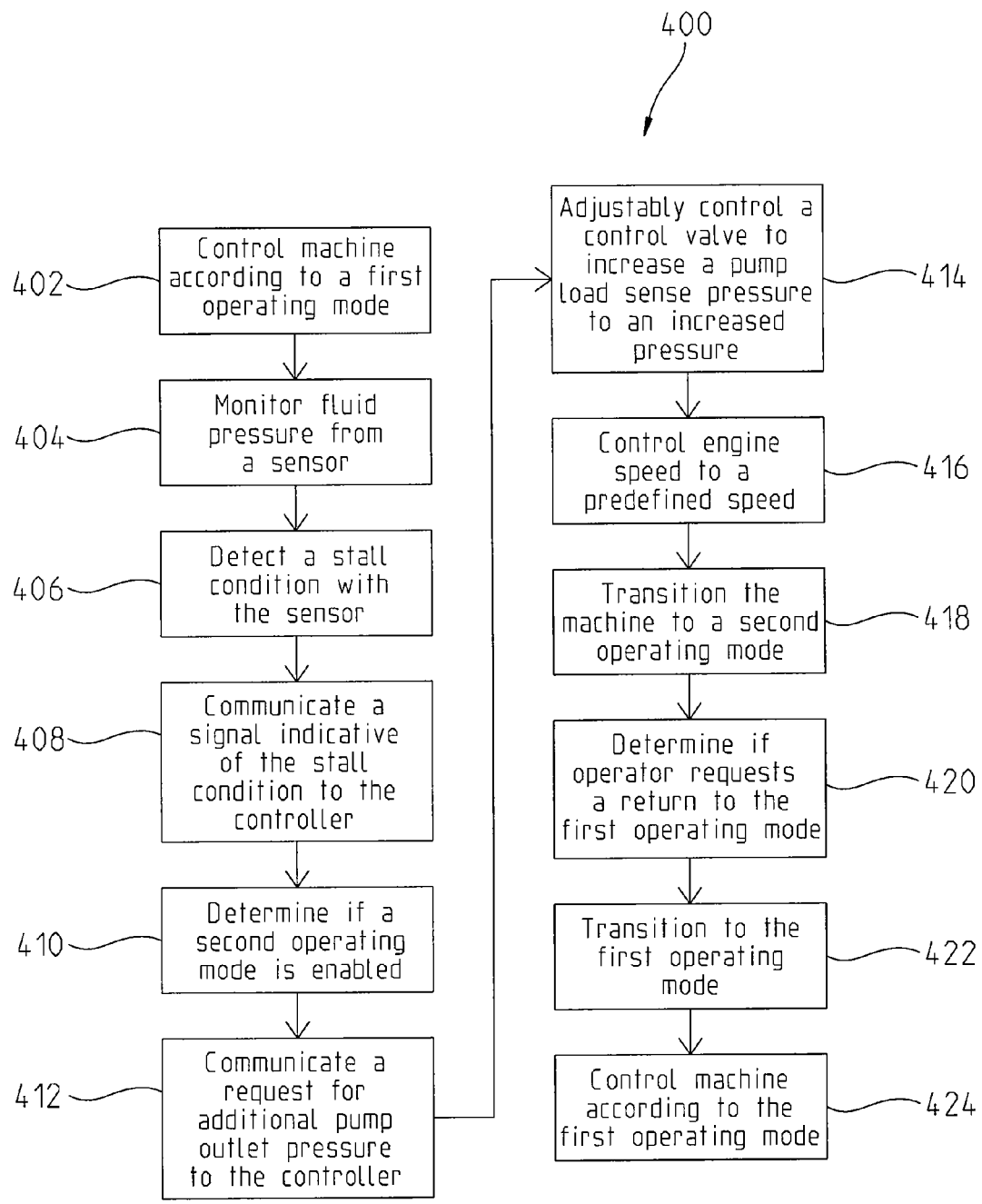
FIG. 4 is a flow diagram of one example of providing increased pump outlet pressure.

Referring to FIGS. 3 and 4, one example of achieving increased pressure is shown. Here, the controller 202 can include a set of instructions stored in its memory 204 that is executable by the processor 206 to adjust pump outlet pressure. One such example of this is shown in FIG. 4. Here, a method 400 is provided with a series of blocks for execution by the control system 200 of the machine 100. Under normal conditions, the machine 100 can be controlled in block 402 according to a first operating mode. In the first operating mode, the hydraulic control system 208 can produce hydraulic pressure between a first pressure (P1) and a second pressure (P2). The first pressure, for example, can be 0 psi or more, but the first pressure (P1) is less than the second pressure (P2). The second pressure (P2) can be related to a stall pressure, which correlates to an operating pressure at which the implement will stall. In some examples, the second pressure (P2) may be referred to a threshold pressure. The controller 202 can be programmed to monitor system pressure and detect when the pressure reaches the second pressure (P2).

An illustrative example of this is shown in FIG. 3. A graphical illustration 300 provides system pressure over a period of time beginning at time A and concluding at some later time F. In FIG. 3, a first curve 302 and a second curve 304 are shown. The second curve 304 can be representative of the pump load sense pressure 254 that exits the control valve 252 and is measured by the sensor 242. This pressure 254 exits the control valve 252 and is fluidly coupled with the hydraulic pump 256 (e.g., via a pump control port). The first curve 302 can be representative of pump outlet pressure 258 that exits the pump 256. As shown, the first curve 302 and second curve 304 can substantially mirror one another over the course of time. The pump outlet pressure 258, as shown by the first curve 302, can be offset from the pump load sense pressure 254, as shown by the second curve 304, due to a substantially constant pump margin or factor. The pump margin or factor is a control mechanism the hydraulic control system 208 uses to deliver a certain amount of oil across the opening of the valve. The value of pump margin can be dependent on the operating mode of the machine. This can impact the responsiveness of certain functions of the machine.

In FIG. 3, the machine 100 is shown being selectively operated in the first operating mode between time A and time B. During this time period, the pump outlet pressure can fluctuate between the first pressure (P1) and the second pressure (P2). Although the first pressure (P1) is shown as being greater than 0 psi, the pump outlet pressure is generally controlled in the first operating mode between 0 psi and the second pressure (P2). The second pressure (P2) can vary based on the type and size of the machine, but in one non-limiting example the second pressure (P2) can be between 3200-3700 psi. As the pump outlet pressure increases, the method 400 advances to block 404 such that the sensor 242 monitors the pump load sense pressure 254.

Moreover, in block 406, another sensor in the hydraulic control system can be used to monitor fluid pressure to detect when a stall condition is reached. For instance, the sensor 234 in FIG. 2 can monitor the load sense pressure from the function control valve 232. A threshold pressure can be stored in the memory 204 of the controller 202 such that as the sensor 234 detects load sense pressure and communicates the pressure reading to the controller 202, the controller 202 can continuously compare the load sense pressure to the threshold pressure. In FIG. 3, the threshold pressure can be referenced by pressure 306. This threshold pressure can be equivalent to the value of the second pressure (P2), or it can be a pressure value offset from the second pressure (P2) by a constant (e.g., 100 psi). While the controller 202 is capable of detecting the stall condition, the sensor 234 can also communicate a signal to the controller 202 indicative of an active stall condition in block 408 of the method 400.

In any event, as a stall condition of the machine 100 is detected, the method can advance to block 410 where the controller 202 can determine whether a second operating mode is enabled. The second operating mode can be enabled to achieve a higher pump outlet pressure than can otherwise be achieved in the first operating mode. In one example, block 410 can be executed by the controller 202 to determine whether the operator has enabled this mode. For instance, the operating mode switch 226 in FIG. 2 can be triggered between an enabled position and a disabled position. If the operating mode switch 226 is enabled, then a signal is communicated to the controller 202 along communication link 228 indicative of the operator's intent. In addition, the sensor 214 can communicate a position of the operator's seat to the controller 202 via communication link 216. For example, in a backhoe loader, if the seat is positioned in a direction to operate the backhoe (i.e., facing in a rearward direction), the controller 202 can be configured to interpret this position as enabling the second operating mode. Alternatively, if the operator's seat is positioned in a direction to operate the loader (i.e., facing in a forward direction), the controller 202 may interpret this signal as being indicative of disabling the second operating mode. Similar interpretations and determination may be made by the controller 202 in other types of machines. Thus, in block 410, the controller 202 can execute a set of instructions to determine whether the second operating mode is enabled.

If, in block 410, the controller 202 determines the second operating mode is disabled, then the machine 100 will continue to operate in the first operating mode and the pump outlet pressure will be limited by the threshold pressure. If, however, the controller 202 determines in block 410 that the second operating mode is enabled, the method 400 can advance to block 412 where the controller 202 can receive a request for additional pump outlet pressure above the second pressure (P2). This communication may likely come from the operator via one of the operator input mechanisms (e.g., mechanism 218 or 222). An example of this is shown in FIG. 3. As the pump outlet pressure 302 and pump load sense pressure 304 continue to increase along each respective curve, the controller 202 detects and communicates the stall condition in blocks 406 and 408. Since the controller 202 further determines in block 410 that the operator has enabled the controller 202 to control the machine 100 according to the second operating mode once an active stall condition is detected, the controller 202 can take the necessary action to transition the machine 100 from the first operating mode to the second operating mode. In other words, the controller 202 can recognize that the operator is requesting additional pump outlet pressure to perform a craning or digging function, and to meet this request, the operator via one or more of the operator input mechanisms is communicating a request to the controller to increase pump outlet pressure so the desired function can be completed.

Once block 412 is completed, the method 400 can advance to blocks 414, 416 and 418 to further transition the machine 100 into the second operating mode. In FIG. 3, the controller 202 transitions the machine 100 to the second operating mode between Time B and Time C. In block 414, the controller 202 can send additional current to the control valve 252 to increase the pump load sense pressure 254. In doing so, the pump outlet pressure 258 increases at the same time. As shown in FIG. 3, the pump outlet pressure 302 can be ramped up to a third pressure (P3) at an increasing rate 314 as the controller 202 executes block 418. The manner in which the pressure is increased during this transition can be substantially linear, although in other aspects the pressure can be increased in a curved relationship. Alternatively, in block 418 an electrohydraulic valve or electronically-controlled pump can allow the pressure to be metered in such a way that the higher pressure is not simply adjusted in an on/off-like manner. For instance, the pressure can be increasingly adjusted to a higher pressure between the second pressure (P2) and the third pressure (P3) depending on the type of operator input being received by the controller 202. If the operator continues to request additional lifting or digging force, the pressure can be metered to meet these expectations. Additional current from the controller 202 in block 414 can induce the control valve 252 to move to a position that restricts an opening through which fluid passes, thereby increasing or boosting fluid pressure exiting the valve.

In one aspect of this embodiment, the second operating mode may not be intended to be a productivity mode. The second operating mode can be designed to give the operator additional craning or digging force as needed, but once the craning or digging operation is completed, the machine 100 can return to the first operating mode. In this manner, the first operating mode can be considered a more productive mode for performing different operations than the second operating mode. To achieve this, in block 416 the controller 202 can send a command to the engine control module 210 to adjust engine speed. For example, the engine speed can be adjusted to a speed that provides more torque to improve load acceptance and improve engine noise, shuddering, etc. at higher pump torques. The engine speed can be adjusted to an engine speed such as 1400 RPM. Engine speed may fluctuate between a speed range where the average speed corresponds to the fixed engine speed (e.g., between 1350-1450 RPM). Other machines may be controlled to a different engine speed. In one example, the engine speed can be maintained or fixed at a set speed. In other examples, the controller 202 can communicate with the engine control module 210 not to exceed a predefined engine speed. As engine speed is either held or maintained under a predefined speed in block 416, the controller 202 can further disable or configure the operator input mechanisms (e.g., joysticks, pedals, levers, etc.) to be unresponsive while the machine is operating in the second operating mode. As such, feedback is communicated to the operator that the machine is now operating in a different operating mode.

In FIG. 3, the machine 100 is being controlled in the second operating mode between Time C and Time D. As shown, the pump outlet pressure 302 and pump load sense pressure 304 are maintained at the higher pressure level. Both pressures can be maintained at a relatively constant pressure, e.g., the third pressure (P3), in the second operating mode. The controller 202 can continuously send the same amount of current to the control valve 252 so that the pump load sense pressure 304 remains at the higher pressure in this mode. In one aspect, the control valve 252 can have a known, calibrated relationship such that the controller 202 can be programmed to send a certain amount of current to the valve 252 (or its solenoid) to increase the pump load sense pressure to the higher pressure. In this way, other limitations in the hydraulic control system that prevent the pump outlet pressure from exceeding the second pressure (P2) in the first operating mode, for example, can be overcome by the controller 202 in the second operating mode by communicating additional current to the control valve 252 for achieving the higher pressure.

The relationship between current and pump load sense pressure can be a directly proportional relationship stored in the form of a graph or table in the memory 204 of the controller 202. In other aspects, the relationship between current and pump load sense pressure may not be directly proportional, but the controller 202 can still be programmed with look-up tables, graphs, etc. to control the amount of current sent to the flow valve 252 to achieve a certain amount of pressure. The current-pressure relationship may be adjusted for other variables such as fluid temperature (as measured by the temperature sensor 238), fluid viscosity, and other factors or characteristics of the hydraulic control system 208. As such, the control system 200 can maintain substantial control over the pump load sense pressure 304 to achieve a desirably higher pump outlet pressure to produce a higher craning or digging force.

As the machine 100 operates in the second operating mode, the method 400 can advance to block 420 to determine if the previous conditions have changed such that the operator requests a return to the first operating mode. In one non-limiting example, the controller 202 can continuously monitor the load sense pressure being measured by the sensor 234, where the load sense pressure corresponds to the highest load pressure in the hydraulic control system 208. Once the load sense pressure is detected below a threshold pressure, the controller 202 can return the machine 100 to the first operating mode. An illustrative example of this is shown in FIG. 3 between Time D and Time E.

Between Time D and Time E, the controller 202 can communicate a different current to the control valve 252 to reduce the pump load sense pressure 304, and thereby reduce the pump outlet pressure 302. The pump load sense pressure 304 can ramp from the third pressure (P3) to a lower pressure at a decreasing rate 316. The exit or decrease rate 316 can be faster than the entry or increase rate 314, i.e., the machine 100 transitions out of the second operating mode quicker than it enters the second operating mode. Alternatively, the exit rate 316 can be approximately the same as the entry rate 314 in some embodiments, whereas in other embodiments the entry rate 314 may be faster than the exit rate 316.

As the machine 100 transitions from the second operating mode to the first operating mode in block 422, the pump load sense pressure 304 can be decreased to a pressure less than the second pressure (P2). In some aspects, the controller 202 can command a pump load sense pressure 304 to be equivalent to a load sense pressure measured by the sensor 234. In any event, as fluid pressure passes through the control valve 252, the controller 202 can control the pump load sense pressure 304 by adjusting the amount of current being sent to the control valve 252 (which thus controls pump outlet pressure).

Once the machine 100 transitions back to the first operating mode, the method 400 advances to block 424 (same as block 402) to control the machine 100 accordingly. Thus, the machine 100 can operate more productively since engine speed is not limited and the operator can control the machine 100 via the different operator input mechanisms which are re-enabled in the first operating mode. In FIG. 3, this is shown between Time E and a later Time F where the pump outlet pressure 302 and pump load sense pressure 304 are controlled between the first pressure (P1) and the second pressure (P2).

As described, the second operating mode can be configured as a software-enabled feature that requires operator input to enable or activate. In other aspects, however, the second operating mode can be configured such that the method 400 skips block 410 and if a stall condition is detected, the controller 202 automatically transitions the machine 100 to the second operating mode. In this aspect, the second operating mode is continuously enabled. In another aspect, however, it may be more desirable to interpret the operator's intent as to whether to enable the second operating mode. Therefore, block 410 is performed and the controller 202 can perform a set of instructions or steps as previously described to determine whether the operator has enabled this software feature.

In addition, if the second operating mode is enabled and the machine 100 is being controlled in this mode, the operator may have the ability to trigger the second operating mode switch or reposition the operator's seat, for example, to disable the second operating mode. In this instance, the controller 202 can interpret such an input from the operator and execute block 422 of the method to transition back to the first operating mode. In other aspects, if the machine is operating in the second operating mode, the controller 202 may only disable the second operating mode if the condition or conditions that triggered a stall condition change such that the controller 202 interprets a desire to return to the first operating mode.

In the second operating mode, the pump outlet pressure can be increased to a pressure unattainable in the first operating mode. In one non-limiting example, the higher pressure can be approximately 3900-4000 psi. In another example, the higher pressure can be greater than 3700 psi. The higher pressure can be dependent upon the machine type and control system 200.

The embodiments of FIGS. 2-4 represent one or more ways to achieve the higher pump outlet pressure in the second operating mode. However, there are alternative systems or methods for achieving similar higher pressures. Pump control systems can be developed to manipulate direct pressure control to achieve higher pressures. Stall conditions can be detected by monitoring cylinder or implement position, cylinder or implement velocity, and lever command. Thus, there are alternative aspects to the present disclosure.

Figure 5:
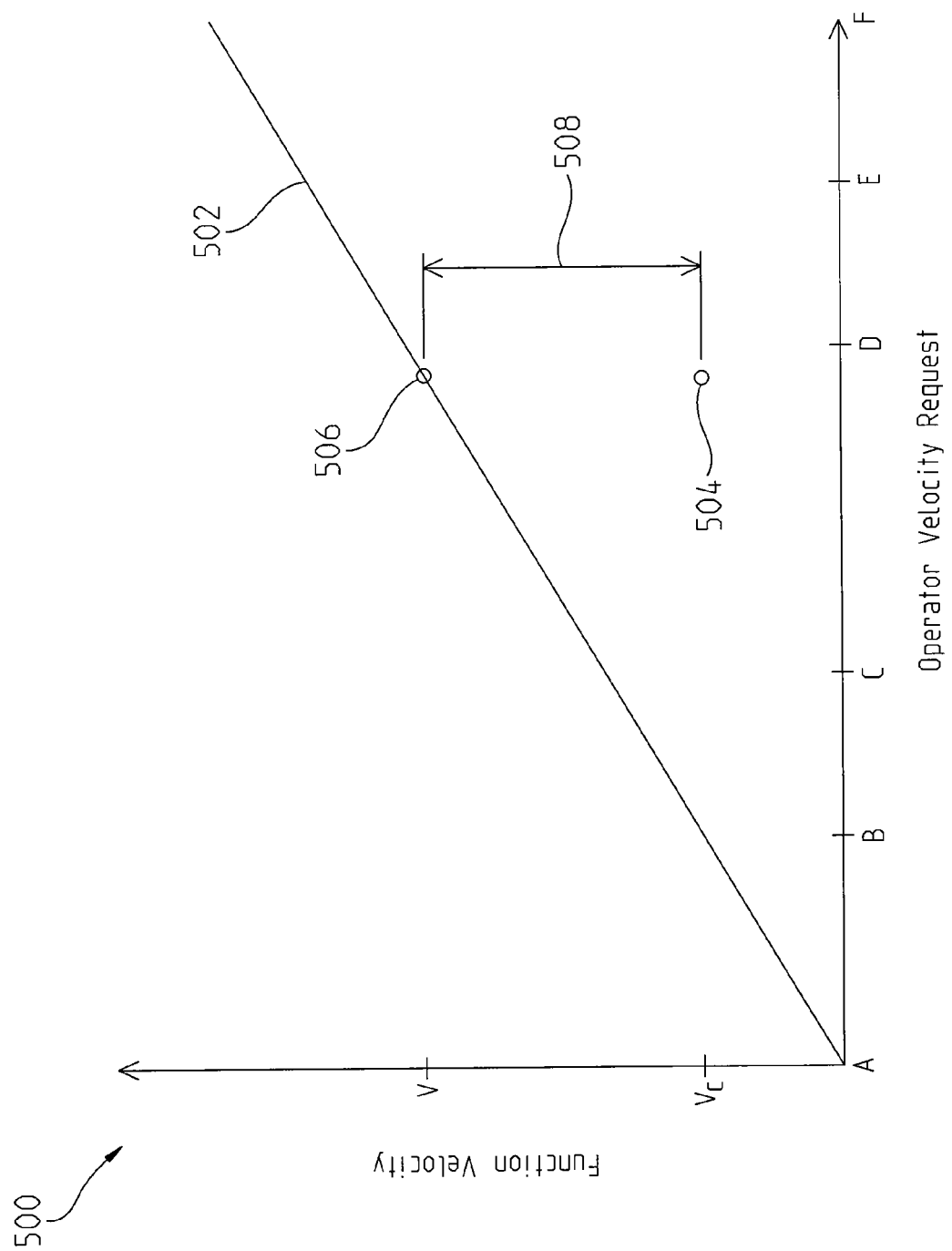
FIG. 5 is a graphical representation of an input command and a function velocity.

In one alternative aspect, a different stall sensing technique can be utilized in method 400 to detect a stall condition. For example, a controller 202 can be programmed to monitor input commands to control a cylinder velocity. An example of this is shown in FIG. 5. In FIG. 5, a graphical representation 500 of input command (e.g., operator velocity request) is shown relative to function velocity. The graphical representation 500 includes a valve metering curve 502 that can be stored in the memory 204 of the controller 202 such that a measurement or detection can be made and input to the controller 202, and the processor 206 can execute a program or set of instructions to determine an output. The curve 502 can be linear, parabolic, hyperbolic, or any other type of curvature including empirically-derived curves. The curve 502 may also include more than one curve with differing shapes. In FIG. 5, for example, the metering curve 502 is shown as being substantially linear. However, in other embodiments, the metering curve 502 may include a plurality of linear curves each having different slopes. This is further described below.

As also shown in FIG. 5, the curve 502 can be calibrated to define different regions of control. For example, in a first region between data points A-B, a small movement of a joystick or lever may achieve fine metering control of the control valve 252. Here, the response to such movement may not induce a sudden increase in function velocity. In one example, the curve 502 may include less slope in order to achieve fine metering control of the control valve 252.

As the joystick or lever is moved further, the controller 202 may interpret an input command in a transition region between points B and C on the valve metering curve 502. Here, the slope of the curve 502 may be greater than the slope between points A and B. A third region can be defined along the curve 502 between points C and D. Here, the curve 502 can have even greater slope than either the first region defined between points A and B and the second region defined between points B and C. This third region can represent more coarse metering such that movement of the joystick or lever induces a greater increase in function velocity of the cylinder (e.g., the cylinder for controlling the boom during a craning operation).

The metering curve 502 can include another transition phase or a fourth region defined between points D and E. The slope of the curve 502 can be the same as or different than the slope between any of the first region, second region, or third region. Moreover, the valve meter curve 502 can include a maximum travel of the joystick or lever corresponding to point F on the curve 502. As the joystick or lever is moved to its respective maximum travel position, the function velocity reaches a maximum velocity as well. Depending on the shape of the curve 502, the function velocity may not increase as quickly or at the same increasing rate between points E and F as it does between points C and D.

The valve metering curve 502 can be used by the controller 202 to detect or sense a stall condition. For example, with the curve 502 being stored in the memory 204 of the controller 202, an input command from an operator input mechanism can be received as an input by the controller 202. The controller 202 can interpret the input command such that if the input command is greater than what is being measured at the cylinder by a certain amount, the controller 202 can detect the machine 100 is operating at or near a stall condition. The controller 202 can be programmed to interpret the aforementioned difference and compare it to a threshold, and based on the comparison determine whether the machine 100 is at stall. If the controller 202 detects a stall condition, the controller 202 can proceed by transitioning to the second operating mode (assuming in certain embodiments the second operating mode is enabled).

To further illustrate this detection method, for a given input command the cylinder velocity can be measured and the measurement can be communicated to the controller 202. In FIG. 5, for example, the input command may achieve a measured function velocity corresponding to data point 504 on the graph 500. The controller 202, however, locates the input command on the curve 502 and determines that the requested function velocity corresponds to data point 506. The difference between the commanded velocity (i.e., point 506) and the measured velocity (i.e., point 504) is shown by reference number 508. The controller 202 can compare this difference 508 to a threshold value, and if the difference 508 exceeds the threshold then the controller 202 can detect that the machine 100 is in or near a stall condition.

The input commands can come from a variety of sources. For example, input commands may come from a manual linkage with a lever or joystick, a pilot control system that interprets movement of a joystick or lever, or an electrohydraulic system in which an electronic signal is communicated from an operator control mechanism to control an electrohydraulic valve. Other input commands can be interpreted from other operator input mechanisms. The manual control linkage can include a sensor or other measuring means for detecting linear or angular displacement of a joystick or lever. Alternatively, the force applied to the joystick or lever can be detected by a sensor and communicated to the controller. In a pilot control system, a sensor can detect linear or angular displacement of a joystick or lever, force applied to the joystick or lever, or monitor regulated pilot pressure output and communicate said detection to the controller 202. In an electrohydraulic control system, a sensor can detect and communicate an electronic signal corresponding to linear or angular displacement of a joystick or lever, applied force, output current, or via other protocols (e.g., CAN, LIN, etc.). Linear or angular movement or force applied to a joystick or lever can be measured by coupling a sensor (e.g., a Hall effect sensor coupled to a base of the joystick or lever) thereto and measuring movement. A strain gauge may also be coupled to the shaft or linkage of the operator input mechanism for detecting movement.

The above-mentioned input commands are associated with manipulating the position of a main hydraulic control valve spool or poppet. There are, however, other ways to detect input command such as taking measurements at the main control valve. For example, a manual control valve can be monitored based on force or spool or poppet position. A pilot valve can be monitored for an input command based on valve position, force, and control pressure. An electrohydraulic valve can likewise be monitored based on valve position, force, control pressure, solenoid current, and via other protocols (e.g., CAN, LIN, etc.). Other systems may provide additional ways to determine an input command for detecting a stall condition. Based on these detection mechanisms, the controller 202 can infer or determine a stall condition based on how the input command compares to the curve 502 in FIG. 5.

Cylinder velocity can be determined independently from the manual, pilot, and electrohydraulic control methods. For example, velocity can be calculated by differentiating a measured position of the cylinder rod. It may also be possible to directly measure cylinder velocity. Alternatively, an accelerometer may be incorporated into the machine 100 to measure cylinder acceleration, and the controller 202 can integrate the acceleration to determine cylinder velocity. Alternatively, the position or velocity of a linkage or other component which moves in a known relationship to the cylinder may be measured and the corresponding velocity of the cylinder may be calculated based on this known relationship (e.g., a kinematic model). These are only a few examples of how cylinder velocity can be measured or calculated, but other methods can be used.

Other methods for detecting a stall condition can include comparing an input command based on a measured pump displacement (e.g., swash position). In this embodiment, a sensor can be used to measure pump displacement. The controller 202 can be programmed to store a table, chart or graph that correlates cylinder velocity to pump displacement. Thus, if an input command corresponds to a certain measured pump displacement, but the measured pump displacement is less by greater than a threshold amount for what would be expected for the given input command, the controller 202 can detect a stall condition. A graphical representation 500 similar to that in FIG. 5 may be used by the controller 202 for such a detection method.

Another detection method is comparing an input command to a measured flowrate in the hydraulic control system 208. For instance, a flow meter or sensor can be located at or near pump outlet or at another location in the system. The flow meter can measure fluid flow going to the cylinder. The controller 202 can be calibrated with a table, chart, or graph such that the relationship between a flow rate corresponds to a function velocity. If the flow measures differently than as expected based on the chart, graph, or table, the controller 202 can determine based on the difference whether the machine 100 is at or near stall. The controller 202 can also be programmed such that cylinder sizes and other geometrical dimensions are known. The controller 202 can execute a set of instructions to convert the curve 502 of FIG. 5 into a flow curve based on input command. Thus, a movement of the joystick or lever may correlate to a certain flow rate on the flow curve. If the measured flow rate for a given input command is different than what the controller 202 would expect based on the flow curve, the controller 202 may detect a stall condition.

The controller 202 can be programmed to detect a stall condition by measuring fluid pressure at various system locations other than by sensor 234. For example, fluid pressure can be measured at pump outlet, at a valve workport, or directly at each cylinder. Moreover, there could be a plurality of sensors each positioned at different locations in the hydraulic control system 208 for detecting fluid pressure. In this manner, the memory 204 of the controller 202 can store threshold values for one or more of these fluid pressures, and if a measured fluid pressure exceeds a corresponding threshold, the controller 202 can detect a stall condition.

Another method for detecting stall is to use a load cell or strain gauge to measure cylinder force at the cylinder rod.

Here, a strain gauge or load cell can be coupled to a cylinder rod and directly measure a force at the cylinder. Alternatively, strain gauges or load cells may be coupled to linkages or other components which experience force in a known relationship to the cylinder, and the corresponding cylinder force may be calculated based on this known relationship (e.g., a kinematic model). The measured force can be communicated to the controller 202, and the controller 202 can determine a corresponding pressure based on the measured force. For example, a strain gauge can be positioned near the rod eye between an end of the rod and the rod eye joint. The strain gauge can measure the strain at the joint. Alternatively, a load cell (or linear compression device) can be disposed between the rod clevice and linkage to measure force. In this way, the cylinder is used as a sensing device.

Moreover, the cylinder size and its corresponding dimensions are known and can be stored in the memory of the controller 202. Based on Pascal's Law, the area can be calculated by the controller 202. For a given force measurement, the controller 202 can compute a corresponding pressure. A threshold pressure can be stored in the memory 204 of the controller 202, and after the controller 202 calculates the pressure as a function of measured force, the controller 202 can compare the pressure to the threshold pressure to determine whether the machine 100 is at or near stall.

Other detection methods are also possible. For purposes of this disclosure, the controller 202 can be enabled to detect a stall condition, and once the stall condition is detected the controller 202 can determine if the second operating mode is enabled. If enabled, the controller 202 can transition the control of the machine 100 from the first operating mode to the second operating mode so long as the operator desires to operate in this second operating mode. Once the operator desires to return to the first operating mode, the controller 202 can detect this in a number of ways based on pressure measurements, force measurements, displacement detection, flow measurements, etc. The controller 202 can continue to operate the machine 100 in the second operating mode until a triggering event occurs, and once the triggering event does occur, the controller 202 can transition the machine control to the first operating mode.

Many of the aforementioned examples provide methods for controlling pump outlet pressure with the control valve 252. However, there are other ways to control pump outlet pressure besides the use of the control valve 252. For example, a hydro-mechanical pump control system may be used with a non-proportional control valve. In this example, an on/off solenoid may be triggered to adjust pump load sense pressure to bootstrap to a higher pressure or to a pump cutoff setting. Here, the pump outlet pressure may not be controlled in a manner such as that in FIG. 3, but orifice size in the control system may be used to control how the pressure increases and decreases between the different operating modes.

Another example is with an electrohydraulic pump control system. In one aspect, an electrohydraulic direct pressure control pump can be used. The pump can be configured to directly translate an input current into a pump outlet pressure without the use of the control valve 252 of FIG. 2. This may allow the pump outlet pressure to be metered between pressure levels depending on the operating mode.

Another example may include a hydro-mechanical control system that utilizes an electrohydraulic override signal to generate higher pressure in a different operating mode. For instance, a load sense signal can be input to the pump during a first operating mode, but to get a higher pump outlet pressure an electrohydraulic override signal can increase the pump outlet pressure to a desired level. Other aspects of this example are possible as well.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling a work implement of a machine, the machine including a controller for controlling the implement, a sensor, a hydraulic pump for producing a fluid pressure, and a valve disposed in communication with the pump, the method comprising:
  selectively operating the machine according to a first operating mode, wherein in the first operating mode the hydraulic pump is operably controlled to produce a fluid pressure between a first pressure and a second pressure, the second pressure being greater than the first pressure;
  sending a signal to the controller, the signal corresponding to a request for a fluid pressure greater than the second pressure;
  transitioning over a period of time from the first operating mode to a second operating mode; and
  increasing the fluid pressure from the second pressure to a third pressure over the period of time.

2. The method of claim 1, further comprising:
  detecting a fluid pressure equivalent to a threshold pressure with the sensor, the threshold pressure being equal to or less than the second pressure; and
  sending an electronic signal to the valve to increase the fluid pressure.

3. The method of claim 1, further comprising continuously controlling the pump to produce the third pressure during the second operating mode.

4. The method of claim 1, further comprising:
  detecting a request to produce a fluid pressure between the first pressure and the second pressure while operating in the second operating mode;
  transitioning over a second period of time from the second operating mode to the first operating mode; and
  decreasing the fluid pressure from the third pressure to the requested pressure between the first pressure and the second pressure.

5. The method of claim 4, wherein the second period of time is shorter than the first period of time.

6. A method for controlling a work implement of a machine, the machine including a controller, a sensor, a pump, and a valve disposed in fluid communication with the pump, comprising:
  selectively controlling the vehicle according to a first operating mode, wherein in the first operating mode the hydraulic pump is operably controlled to produce a fluid pressure between a first pressure and a second pressure, the second pressure being greater than the first pressure;
  detecting a stall condition of the machine with the sensor;
  communicating the stall condition to the controller;
  determining if a second operating mode of the machine is enabled, wherein in the second operating mode the hydraulic pump is operably controlled to produce the fluid pressure at a third pressure, the third pressure being greater than the second pressure;

transitioning from the first operating mode to the second operating mode if the second operating mode is enabled; and controlling the pump outlet pressure to the third pressure.

7. The method of claim 6, wherein the detecting step comprises:

detecting an input command from an operator control mechanism;

measuring a function velocity associated with the implement; and comparing the measured function velocity to a predefined function velocity corresponding to the detected input command.

8. The method of claim 7, wherein the detecting an input command comprises measuring a linear displacement, an angular displacement, or a force applied to the operator control mechanism.

9. The method of claim 7, wherein the detecting an input command comprises detecting a position or force applied to the valve.

10. The method of claim 7, wherein the detecting an input command comprises measuring a control pressure or spool position of the valve.

11. The method of claim 6, wherein the detecting step comprises:

measuring a displacement of the pump or a flow rate at a location within a hydraulic control system of the machine; and comparing the measured displacement to a first threshold or the measured flow rate to a second threshold, the first threshold corresponding to a relationship between pump displacement and a function velocity of the implement and the second threshold corresponding to a relationship between a predefined flow rate in the system and a function velocity of the implement.

12. The method of claim 6, wherein the detecting step comprises:

measuring a pressure in a hydraulic control system of the machine;

comparing the measured pressure to a threshold pressure; and detecting the stall condition if the measured pressure is equal to or greater than the threshold pressure.

13. The method of claim 6, further comprising controllably adjusting the pump outlet pressure to the third pressure with an electro-hydraulic valve or an electronically-controlled pump.

14. The method of claim 13, further comprising controlling the electro-hydraulic valve or electronically-controlled pump to incrementally increase pressure from the second pressure to the third pressure when the second operating mode is enabled.

15. The method of claim 13, further comprising:

detecting an input command to return to selectively operating the machine in the first operating mode;

controlling the electro-hydraulic valve or electronically-controlled pump to incrementally decrease pressure from the third pressure to a fourth pressure, the fourth pressure being less than or equal to the second pressure; and transitioning from the second operating mode to the first operating mode.

16. A method of operating a machine having a hydraulic control system for controlling a work implement, the hydraulic control system including a valve and a pump, the method comprising:

controlling the machine according to a first operating mode, the first operating mode being operable to produce a pump outlet pressure between a first pressure and a second pressure, the second pressure being greater than the first pressure;

monitoring a load sense signal indicative of a load pressure in the hydraulic control system;

detecting when the load sense signal reaches a threshold pressure associated with a stall condition;

controlling the machine according to a second operating mode when the stall condition is detected;

increasing a pump outlet pressure to a third pressure as long as the load sense signal is detected at or above the threshold, the third pressure being greater than the second pressure.

17. The method of claim 16, further comprising:

adjusting an engine speed of the machine to a predefined speed as the machine operates in the second operating mode; and maintaining the engine speed at the defined speed so long as the load sense signal is detected at or above the threshold.

18. The method of claim 16, further comprising:

transitioning from the first operating mode to the second operating mode when the machine is being operated in the first operating mode and the load sense signal is detected at or above the threshold, wherein the pump outlet pressure is increased over a first period of time at a first rate; and transitioning from the second operating mode to the first operating mode when the machine is being operated in the second operating mode and the load sense signal is detected at or below the threshold, wherein the pump outlet pressure is decreased over a second period of time at a second rate.

19. The method of claim 18, further comprising controlling the valve or pump to incrementally increase or decrease the pump outlet pressure as the machine transitions between the first and second operating modes.

20. The method of claim 18, wherein the first rate is the same as or less than the second rate.

\* \* \* \* \*